July 12, 1966

J. VANI 3,260,219

CONVEYOR STRUCTURE

Filed June 5, 1964

Inventor
JAMES VANI
By Wallace, Kinzer and Dorn
Attorneys

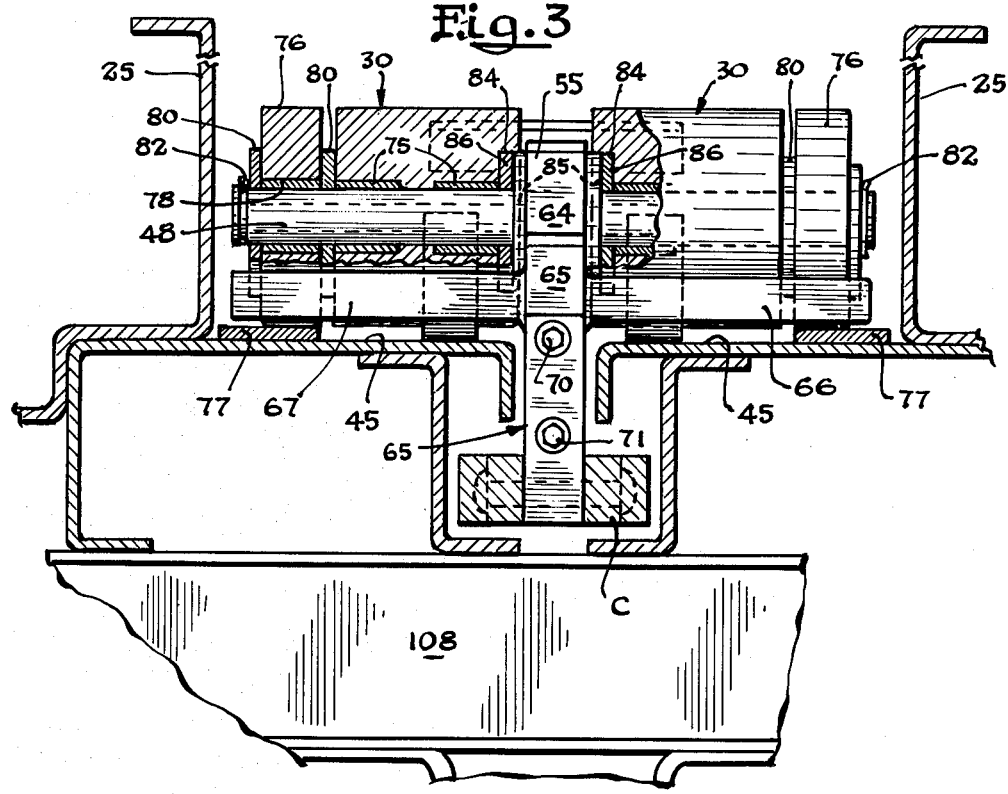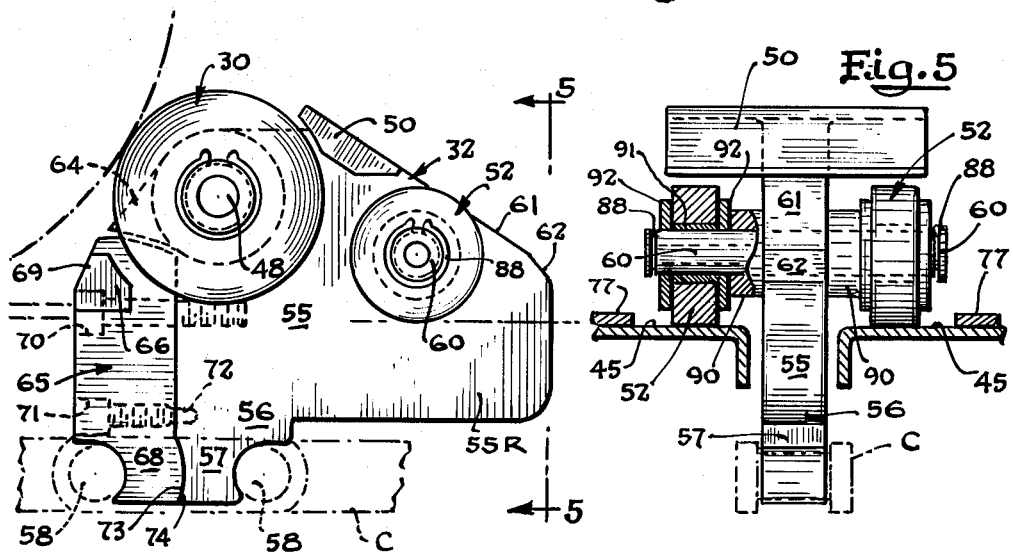

July 12, 1966
J. VANI
3,260,219
CONVEYOR STRUCTURE
Filed June 5, 1964
4 Sheets-Sheet 3
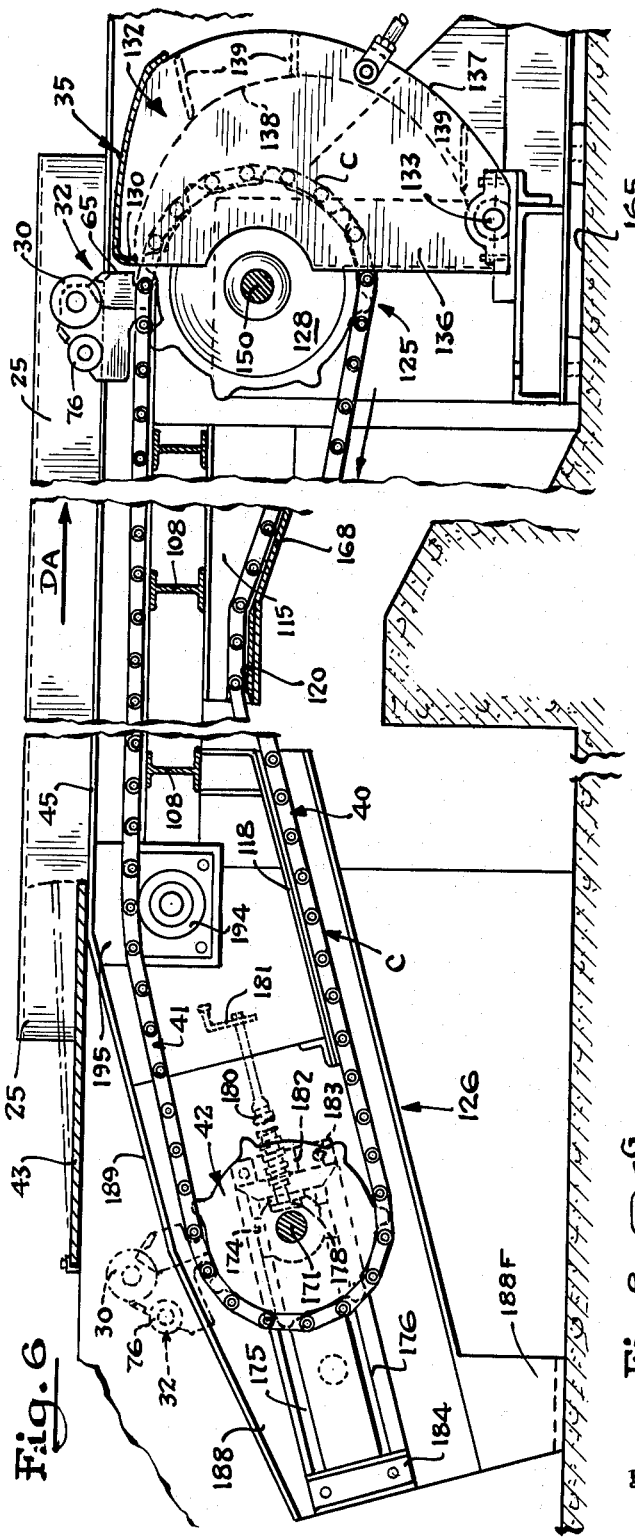
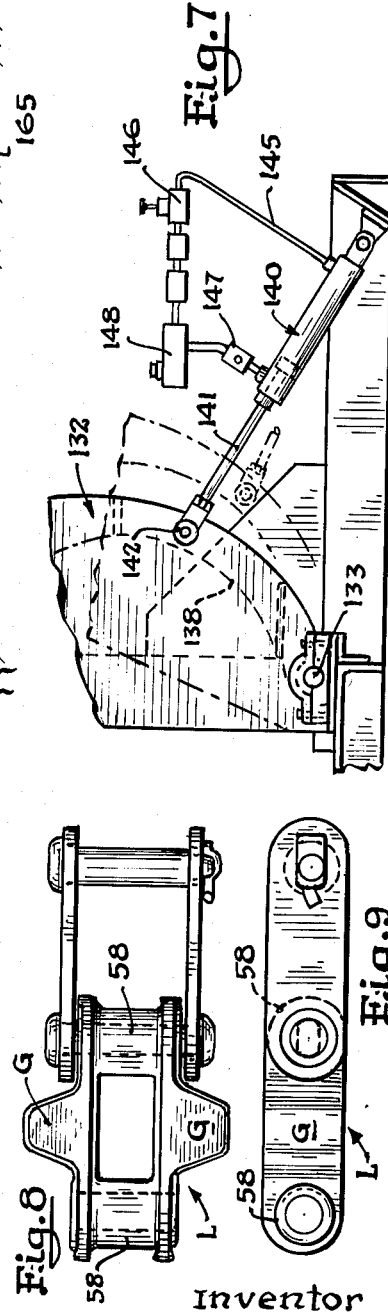
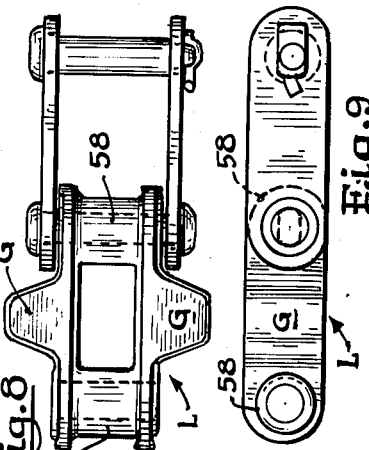
Inventor
JAMES VANI
By Wallace, Kinzer and Dorn
Attorneys July 12, 1966  J. VANI  3,260,219
CONVEYOR STRUCTURE
Filed June 5, 1964  4 Sheets-Sheet 4

Inventor
JAMES VANI
By Wallace, Kinzer and Dorn
Attorneys

United States Patent Office 3,260,219
Patented July 12, 1966

3,260,219
CONVEYOR STRUCTURE
James Vani, Midlothian, Ill., assignor to A. J. Industries, Inc., Los Angeles, Calif., a corporation of West Virginia
Filed June 5, 1964, Ser. No. 372,878
12 Claims. (Cl. 104—172)

This invention relates to conveyor structure, and in particular conveyor structure facilitating the movement of automotive vehicles through apparatus where a system operation is performed on the vehicle, as for example automated car washing equipment.

In a standard form of car washing apparatus, the vehicle to be washed is usually maneuvered by the driver on to a ramp in alignment with the path to be followed by the vehicle through the washing equipment line. Here, the vehicle is parked by the driver, and an attendant in charge is then responsible to hook the front bumper of the vehicle to a conveyor chain by means of a flexible, detachable connector. This chain extends the length of the washing equipment, that is, from the vacuuming and/or steam section, through the scrubbing and rinsing section, to the drying and delivery station. In other words, the vehicle, hooked to the conveyor chain, will be pulled by the chain from the entrance end of the car washing apparatus, where initial cleaning operations are effected, to the exit end of the apparatus where blower units apply forced air to the washed vehicle incidental to completing the washing operation.

It is not an infrequent occurrence for the vehicle owner or driver inadvertently to leave the vehicle in gear or with the brakes set when parking the vehicle on the entrance ramp of car washing apparatus of the foregoing kind. The attendant who is responsible to hook the vehicle to the conveyor chain does not know if the brakes are set or if the vehicle is in gear. If either condition prevails when the conveyor is actuated, the vehicle experiences a severe jolt at the very least, and the conveyor must be stopped, of course, to prevent more severe damage to the brakes or transmission.

In other words, in the standard form of car washing apparatus under consideration, hooking the vehicle to a conveyor, while effective when properly done, may result in damage to the vehicle if the driver is careless enough to leave the vehicle parked with the brake set or the gears engaged. This, to say the least, is disconcerting to both the vehicle driver and the owner of the car washing equipment. It is therefore an object of this invention to obviate such possibility of vehicle damage by eliminating the need for hooking the vehicle to a conveyor chain, and to do this by conveying the vehicle through the washing apparatus by conveyor elements which will automatically disengage the vehicle in the event the vehicle encountered has a locked brake or an engaged gear.

In the standard form of conveyor mentioned above, it is necessary for an attendant at the entrance end of the washing apparatus to complete the necessary hook-up connections. The hook itself is most frequently in the form of a flexible connector such as a short length of chain, presenting at one end a hook to be separably engaged with the conveyor chain and at the other end a hook to be separably engaged with the front bumper of the vehicle to be washed. It is also necessary that the hook to the conveyor chain be detached after the washing and drying operations are completed. Such detachment usually entails another attendant, especially on busy days when a great number of cars are being moved through the washing apparatus; or in any event, detachment of the connector must be effected when delivering the washed automobile from the automated wash line. Further in this connection, the usual arrangement is to have a third attendant responsible for transferring the necessary hook elements from the exit end of the apparatus to the entrance end. Consequently, a number of attendants or workmen are employed in merely connecting and disconnecting the vehicles relative to the traveling conveyor chain, and another object of the present invention is to eliminate altogether the need for hooking the vehicle to be washed to the conveyor that moves the vehicle through the washing equipment.

Specifically, it is an object of the present invention to so construct a conveyor for a vehicle as to include a roller over which one wheel of the vehicle is to be driven while the conveyor is idle, the vehicle then being parked in that state. The conveyor is associated with apparatus, such as car washing equipment, designed to perform a system operation on the vehicle, and the roller is of such size as to engage enough surface of the vehicle wheel that when the conveyor is set in motion or actuated, the roller, carried by the conveyor, will transport the vehicle in a forward advancing direction through the apparatus. No other hook-ups are required, and in the event the vehicle as thus positioned has an engaged gear or a set brake, the roller merely lifts the wheel against which it bears and passes idly on without forcing the vehicle against a set brake or engaged set of gears. At the delivery end of the apparatus, the attendant in charge merely drives the washed vehicle to the parking stand, and there is no need for an attendant to detach a connector between the vehicle and a conveyor chain.

Another object of the present invention is to so associate a conveyor roller, having the characteristics described above, as to be easily separable from a conveyor chain with which it is associated, whereby any malfunction in the roller can be easily corrected without the need to disassemble the entire conveyor chain unit. Specifically this object is achieved by supporting the roller on a carriage having elements at the under surface thereof, below the roller, so formed as to enable the same to be separably coupled to a conveyor chain; and these elements are additionally arranged to enable the same to be selectively tightened to the desired extent on associated elements or links of the chain.

Traffic on a busy day through car washing apparatus or the like presents numerous problems, not the least of which has been the somewhat arduous task heretofore required of the attendants in bending over to make the necessary hook-ups in the manner that has been explained above. Optimum spacing of the vehicles also represents a considerable problem on busy days, and what with these observations it is another object to so arrange the roller structure of this invention as to facilitate easy movement of the vehicle wheel thereover in position to be transported through the apparatus by the roller, and to do this in such a fashion that spacing of the vehicles can be easily determined by attendant simply by transversing any series of rollers until the front of the vehicle being positioned on the conveyor is located in proximity to the rear of the vehicle last positioned; and a related object of the present invention is to construct the roller of sufficient ruggedness and durability as to withstand the forces attendant to the considerable abuse contemplated by the uses described above.

Other and further objects of the present invention will be apparent from the following description and claims and are illustrated in the accompanying drawings which, by way of illustration show preferred embodiments of the present invention and the principles thereof and what is now considered to be the best mode contemplated for applying these principles. Other embodiments of the invention embodying the same or equivalent principles may be used and structural changes may be made as desired by those skilled in the art without departing from the present invention.

In the drawings:

FIG. 3 is a sectional view showing the construction of a roller carriage of the conveyor mechanism;

FIG. 4 is a side view of the carriage and driving roller;

FIG. 5 is a rear view of the carriage on the line 5—5 of FIG. 4;

FIG. 6 is a side view of a chain drive and a chain take-up mechanism;

FIG. 7 is a view of a trap door assembly at the end of the forward flight of the conveyor;

FIG. 8 is a plan view of a link for supporting said carriage;

FIG. 9 is a side view of the link of FIG. 8; and

Figure 1:
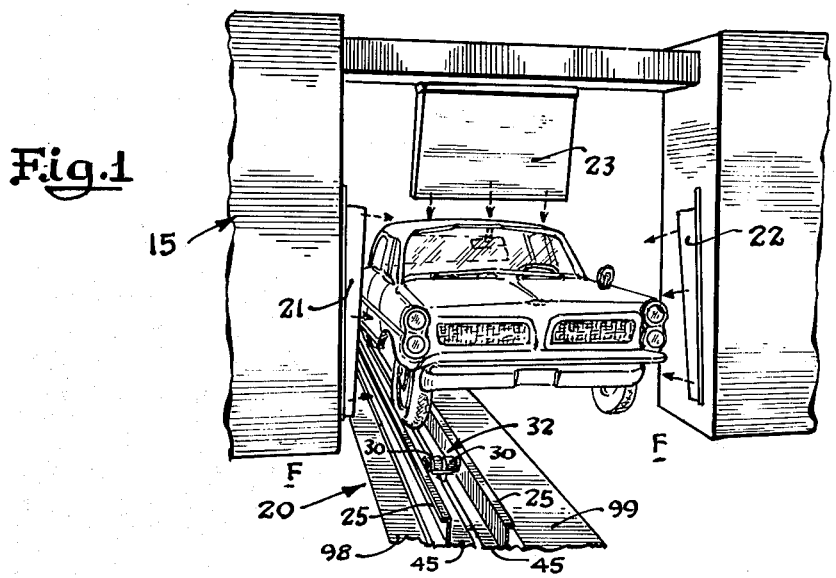
FIG. 1 is a perspective view of an automobile being conveyed through a drying station by a conveyor constructed in accordance with the preferred embodiment of the invention.

Referring now to the drawings, and more particularly to FIG. 1, there is illustrated an automobile being drawn by a conveyor mechanism 20 through a drying station 15 which is one of a plurality of stations such as vacuuming, wetting, scrubbing and rinsing stations of an automated car wash line. The drying station consists generally of two side nozzles 21 and 22 which direct high velocity air along the sides of the car, to sweep the rinse water from the car, while an overhead nozzle 23 sweeps high velocity air to sweep water from the hood and top of the automobile. The nozzles 21, 22 and 23 are stationary, and the automobile is being pulled past the nozzles 21, 22 and 23 by the conveyor mechanism 20. A pair of wheel guiding rails 25 extending upwardly from the floor level F to form a guide channel to guide the right wheel along a path through the car wash line. As seen in FIG. 1, only one conveyor mechanism 20 is being employed and this is operably only on the right tire and wheel of the automobile. While there could, of course, be another identical conveyor mechanism 20 employed for the left tire, practice shows that only one conveyor mechanism is needed.

In lieu of the conventional chain and hook which required an operator to grasp the hook and to connect the hook to the bumper or frame of the automobile so that the automobile would be towed through the stations of the car wash line by the conveyor, the present invention employs a series of spaced wheel engaging rollers 30 journaled in movable carriages 32. The carriages 32 are fastened to a conveyor chain C which pulls each carriage 32 along with outer rollers 76 of the carriages rolling along the conveyor support. The carriages 32 move the rollers 30 to engage against the rear surface of a tire on either the right front or the right rear wheel of an automobile so as to exert a force on the car wheel to cause the car wheels to turn and the car to proceed forwardly through the various stations of the car wash line. When the car reaches the end of the car wash line, the rollers 30 and carriage 32 drop downwardly through a trap door 35, FIG. 6, and are moved by the chain C along a return flight 40 of the chain C in a leftward direction, as viewed in FIG. 6, to the beginning of the car wash line wherein the carriage 32 and tire engaging rollers 30 move around a sprocket 42 and move upwardly to the forward flight 41 of a chain C and through a trap door 43, to engage the wheel of another automobile to convey again an automobile through the car wash line.

A serious problem encountered with the prior art hook and chain type of conveyors was that the automobile was, in many instances, inadvertently left in gear or with the brakes applied so that the conveyor gave the auto a severe jolt causing the stressing of parts of the brakes or transmission, as well as the conveyor chain, with occasional damage to the conveyor or to the car. In the present invention, the attendant or owner of the vehicle will drive the car into the car wash line and over the trap door 43 between the guide rails 25, FIG. 6, on to the supports 45, whereupon the next succeeding carriage 32 forcing the trap door 43 upwardly will bring its wheel engaging rollers 30 against the rear surface of the right car wheel, be it front or rear car wheel, and exert a force to move the car in the direction of the forward or upper flight of the chain 41 in the direction of the directional arrow DA, FIG. 6.

Should the car wheel be resting on the pivotally mounted trap door 43 when the rollers 30 engage the underside of the trap door 43, the rollers 30 will merely roll while lifting the trap door 43 and the car wheel thereon while its carriage moves forwardly without conveying the car. If the car is driven sufficiently forward of the trap door 43 so as not to be resting thereon, but the car is left in gear or with its brakes applied, the car engaging rollers 30 will engage the rear surface of the tire and exert thereagainst a force which is normally sufficient to cause the car to be moved forwardly. However, due to the resistance to the turning of the wheel, the rollers 30 will merely rotate about the axle 48 and lift the tire and car wheel as the carriage 32 continues forwardly beneath the now raised right wheel. Thus, the severe jolt and stressing of either the conveyor, the automobile brakes or transmission is avoided. As best understood from FIG. 4, the lifting of a wheel by the roller 30 is accomplished with a rolling of the rollers 30 about the axle 48 and the tire is lowered down an inclined ramp including an inclined ramp-pad 50 on a carriage 32 and including a pair of rear wheels 52 until the wheel again is resting on the tire support surfaces 45.

The rollers 52 and inclined pad 50 are so designed and inclined, as shown in FIG. 4, to facilitate the driving of a car wheel up and over the rollers 30 to the forward side of a carriage 32, if so desired. This is an important aspect to the invention in that on days of heavy traffic, the space between automobiles can be kept at a minimum by driving the automobile forwardly between the guide rails 25 and upwardly and over one or more of the pairs of rollers 30 and carriages 32 until the spacing between automobiles has been reduced, whereupon the car can be parked on the conveyor base flanges 45 so that the next succeeding rollers 30 and carriage 32 pick up the car and move the car through the car wash line, while maintaining a reduced spacing between the cars.

Preferably, the carriages 32 are spaced six feet apart about the entire length of the chain C so that the automobiles can be brought into close proximity to one another to maximize the amount of traffic flow through the car wash line. That is, the overhang on the rear of one auto from its rear wheels will be spaced within a few feet of the front overhang from the wheels of the car immediately therebehind. The six foot spacing is advantageous in that no cars of United States manufacture have 6-foot axle spacing. Thus, with the rollers 30 of one carriage 32 engaging the front wheel of a car, the following carriage 32 will not have its rollers 30 disposed beneath the rear wheels of the auto.

Another important aspect of the present invention is the ability to securely mount the carriage 32 to the chain C in a detachable manner so that the necessity of changing the spacing of the carriages or the repair of one or more of the carriages does not necessitate the disassembly of the chain C. As can best be understood from FIGS. 3, 4 and 5, the carriage 32 includes a main support member 55, with a downwardly extending main post 56 integrally formed thereon. The main post 56 terminates in a hook or jaw 57 with a concave surface to be disposed about the convex barrel 58 on a chain link L.

The chain link L is designed to receive the main post of the carriage 32 and has a pair of wing-shaped glides G to support the chain and its inverted carriage 32 on the return flight of the conveyor. The barrels 58 are hollow to receive the pins of attaching links of the chain as seen in FIG. 8.

The main support 55 also includes a rearwardly extending portion 55R in which is journaled an axle 60 for the rear rollers 52. In the preferred form of the embodiment of the invention, the inclined ramp pad 50 is also integrally formed on the support 55 and is inclined at the same angle of inclination as is top surface 61 of the body support 55 which constitutes with inclined pad 50 a ramp construction, FIG. 5, over which the tire rolls as it is being lifted. A slight beveled surface 62 is also provided at the lower end of the top surface 61 of the support 55 to facilitate the climbing of the tire over the top surface 61 and across the bar 50 and rollers 30.

The support 55 serves to journal the support shaft or axle 48 for the rollers 30 and has a forward nose 64 extending forwardly of the axle 48 between the pair of rollers 30. Disposed immediately beneath the nose 64 is an attached safety and securing post 65. Viewed from the front as in FIG. 3, the safety and securing post 65 is T-shaped with a pair of wiper or safety bars 66 and 67 extending transversely out before the rollers 30 and before the pair of rollers 76 and in close proximity thereto to provide a wiper or safety bar that prevent entry of a person's foot beneath one of the rollers 30 or wheels 76. The wiper bars, 66 and 67, as best seen in FIG. 3, extend close to the support surfaces 45 and close to the rollers 30 to prevent the insertion of materials under the rollers 30 or rollers 76 that would tend to lift the carriage 32 upwardly so as to jam the carriage 32 against forward movement. The safety bars 66 and 67 have inclined upwardly and rearwardly extending surfaces 69, FIG. 4, tending to cam upwardly objects over the rollers 30.

Another function of the securing and safety post 65 is to cooperate with the main post 56 of the main body support 55 to constitute a detachable securing means for the carriage 32. As readily observable from FIG. 4, the securing post 65 has a hook or jaw portion 68 with a concave surface adapted to be inserted around a barrel 58 of the link L of chain C in the manner of hook or jaw portion 57 of the support 55. The jaws 57 and 68 are extensible in that the jaws 57 and 68 are adapted to be separated from each other at their common interface to assure that the jaws tightly grip the rounded chain drums or barrels 58. For this purpose, a lower screw 71 is threaded only in the securing post 65 and has an unthreaded end disposed in an aperture in the main support 55. Thus, turning of the screw 71 in one direction with its unthreaded end portion 72 bearing against the main support 55 the jaws 57 and 68 are spread apart to bear more tightly against the concave surfaces on the chain drums 58 while creating a larger gap at mating surfaces 73 and 74 of the main post 56 and securing post 65. The tightening of upper screw 70, which is threaded in the main support 55 locks the posts in their extended position about the barrel 58 of the link L.

To release the carriage 32, the screws 70 and 71 are loosened and removed and then the securing post 65 is pivoted in a counter-clockwise direction, as viewed in FIG. 4, about the drum 58 of the chain link L and removed from abutting engagement with the main post 56 of the support member 55. After removing the securing post 65, the main support 55 can readily be lifted from its position on the chain link L. The extensible jaws 57 and 68 are so hooked about the chain drums 58 of the supporting link L that the carriage 32 is securely held even when the carriage 32 is inverted on the return flight of the conveyor.

The carriage 32 must be ruggedly constructed to withstand wear under most adverse wear conditions in which continual quantities of water with detergents, sand, grit, dirt and oil are disposed on or washed about the carriage with the cleaning of the car. Also, the carriage 32 must be sufficiently rugged to bear up under the forces of pulling or pushing a car and having a car driven thereover. Preferably, the rollers 30 are formed of aluminum and the rear rollers 52 are of steel with the main support 55 and securing bar 65 of cast aluminum to afford a lightweight but sufficiently strong carriage 32. However, other material may be used such as nylon or other plastic materials and still be within the purview of the present invention. The rollers 30 each have a pair of bearings 75, preferably of nylon or the like to support the rollers for rotation about the axle 48. Secured on the outer ends of the axle 48 adjacent the rollers 30 are the spaced rollers 76 which roll on wear plates or glides 77 extending the full length of the car wash line. It will be recognized that the rollers 76 are in effect bearing supports for the opposite ends of the axle means 48 of the roller means 30, and that the wear plates 77 are in turn supports for the rollers 76, so that the rollers 76 and cooperating wear plates 77 enable the roller means 30 and the related axle to effectively bear the weight of a vehicle applied thereto either when the vehicle wheel is driven over the roller means 30 or when the roller means 30 lifts a vehicle wheel as the result of inability to move the vehicle when the conveyor is in operation. Thus, it will be seen that the present structure includes bearing means rigidly supporting the axle of the roller means 30 against bending forces imposed thereon due to the weight of a vehicle in turn imposed on the roller means 30. The outer rollers 76 are likewise made of aluminum or hardened steel and have nylon bearings 78 on the supporting shaft 48. Nylon spacers 80 can be disposed between the outer rollers 76 and the rollers 30 to act as thrust washers and snap rings 82 are fitted in grooves at the ends of the axle 48 to lock the rollers 76 and rollers 30 on position upon the shaft 48.

It should be noted that the rollers 30 have annular shoulders 84 overlying the rounded surface 85 on the main body support 55 at the axle 48 so as to protect the nylon bearings 75 for the rollers 30 against dirt and water falling directly into the bearings 75. Also, nylon thrust washers 86 are protected by the annular shoulders 84 against the entrance of dirt and grime falling directly therein. The rear rollers 52 of the carriage 32, as best seen in FIG. 5, are secured by spring clips 88 against axial movement from the support shaft 60 which extends through bosses 90 of the main support 55. The rear rollers 52 are also provided with bearings 91 of nylon or the like and are held by spacer washers 92 in proper position on the shaft 60.

It should be noted that the rear rollers 52 rotate directly on the tire engaging surfaces 45 whereas the large roller 76 rotates on the wear bars 77. The rollers 76 are preferably of the same diameter as the rollers 30 and ride on the wear bars 77 which do not extend under the rollers 30. Thus, the wear bars 77 and rollers 76 hold the rollers 30 spaced from engagement with the tire engaging surface 45 so that the rollers 30 are free to rotate independently of the rollers 76. The ability of the rollers 30 to be free rolling is of importance where the car is braked or its transmission is in gear, the rollers 30 being free to rotate as the car wheel is lifted thereover, and can turn in a reverse direction from that of the rollers 76 which are continuing to advance the carriage 32 as the rollers 30 turn in the opposite direction.

Figure 2:
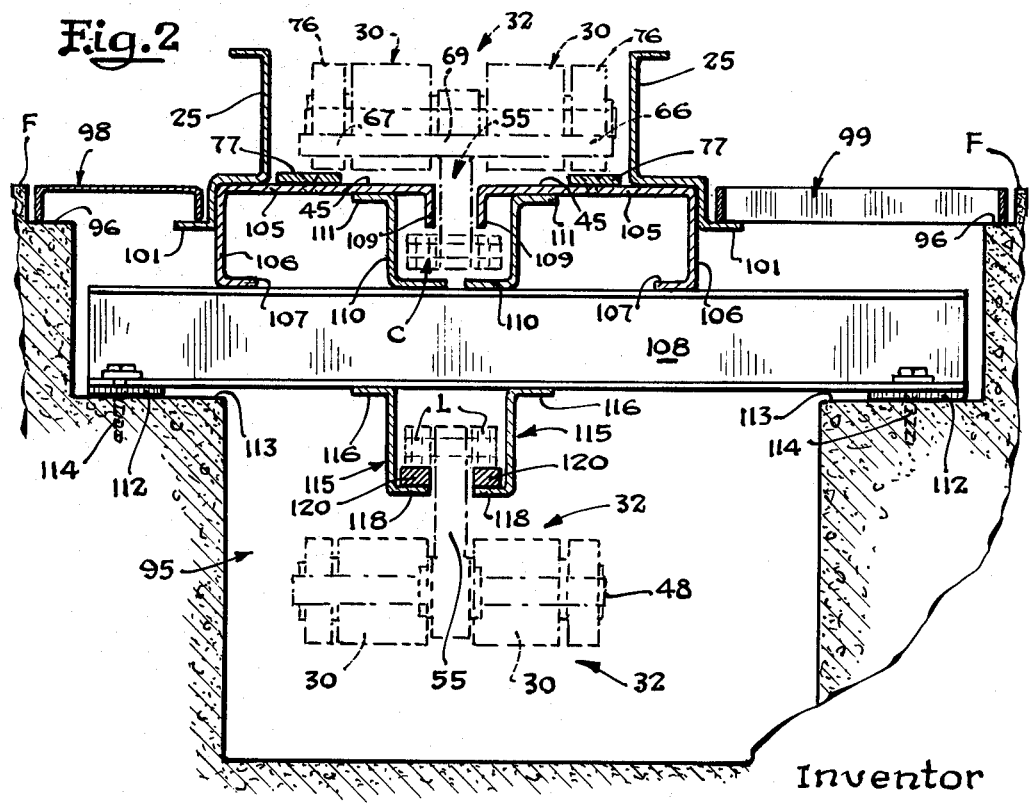
FIG. 2 is a sectional view of a pit and the conveyor mechanism of FIG. 1.

The construction of the foundation and support for the carriage 32 can best be appreciated from FIGS. 1 and 2 wherein is shown the concrete foundation having an open pit 95. The open pit 95 is preferably formed with spaced upper shoulders 96 to support the respective outer edges of a galvanized plate 98 and a grating 99, both of which are approximately flush with the floor level F. The grating 99 and galvanized plate 98 permit the draining of water downwardly into the pit 95 wherein it is collected through convenient outlets, not shown.

The inner edges of the plate 98 and grating 99 are disposed on outwardly turned flanges 101 which are integrally formed on the respective guide rails 25. The guide rails 25 are secured in a simple manner such as by welding or bolting to a main horizontal support member 105 which has a downwardly extending flange 106 with an inturned foot 107 by which the horizontal support 105 is secured at the outer portion to each of a series of main support I beams 108. The opposed horizontal supports 105 are also supported at their adjacent positions by a channel-shaped support 110 which has a pair of horizontal extending flanges 111 disposed immediately beneath the tire supporting surfaces 45 on the horizontal supports 105. The bottom of the support channel 110 is fastened by fasteners to the I beams 108. The horizontal supports 105 terminate in downwardly extending flanges 109 serving as guides for the body support 55 of the carriage 32. Also, the channel support 110 serves as an enclosure or housing for the upper flight of the chain C.

The I beam 108 rests on spacer blocks 112 and is secured by suitable anchor-type fasteners 114 to lower shoulders 113 of the concrete foundation. A number of I beams 108 are placed at various intervals along the entire wash line to provide supports for the guide rails 25 and horizontal supports 105.

To provide a return path for the carriage 32 when it is on the return flight 40 of the chain C and in its inverted position, as shown in FIG. 2, there is provided Z section members 115, each of which has an outwardly turned flange 116 secured to the respective I beams 108 and has an inwardly turned lower flange 118 secured to a pair of glide bars 120 extending lengthwise along the car wash to provide guiding and supporting means for the glides G of the chain link L for a carriage 32. The pit 95 has the general configuration, shown in FIG. 2 for most of the length of the wash line, and at the ends of the wash line the pit is deepened to accommodate the motor drive end 125, shown at the right hand end of FIG. 6, and the chain takeup, shown in the left-hand view of FIG. 6.

As the carriage 32, FIG. 6, moves above the sprocket 128, the leading edge of the securing post 65 engages a downturned end 130 of the trap door 35 and forces the trap door 35 to pivot about its pivot pin 133 in a clockwise direction to the dotted line position shown in FIG. 7. The trap door 35 is normally retained in a closed position, as shown in FIG. 6, to prevent someone from accidentally stepping therein. The trap door 35 is a generally hollow, sheet metal member having a pair of opposed side walls 136 and an outer curved front wall 137. Secured to the interior of the curved front wall 137 and curved with the front wall 137 are a pair of spaced ribs 138 which are spaced and supported in rigid position by a series of spaced cross bars 139. The spaced ribs 138 are so arranged as to be engaged by the rollers 30 as the door 35 is forced open by the leading edge of the securing post 65 so that as the carriage 32 is rotated through 180° with the rollers 30 rolling on the ribs 138 and forcing the door 35 open in a clockwise direction. The trap door 35 is held in its closed position by a pressure force of 20 pounds per square inch afforded by a hydraulic cylinder 140 which has a piston rod 141 attached by a clevis 142 to the door 35. The hydraulic cylinder 140 and its control is a commercially available item which, when the door opening force exceeds 20 p.s.i., permits the flow of fluid through an output line 145 and the retraction of the piston 141 until the pressure forcing the door open is relieved, whereupon a regulator 146 supplies fluid to a line 145 to maintain the 20 pounds per square inch pressure closing pressure as the piston 141 moves outwardly of the cylinder 140. To prevent the rapid slamming home of the trap door 35, there is provided a check valve 147 and reservoir 148, which serve in the manner of a dashpot to assure the closure of the trap door 35 without the slamming shut.

Figure 10:
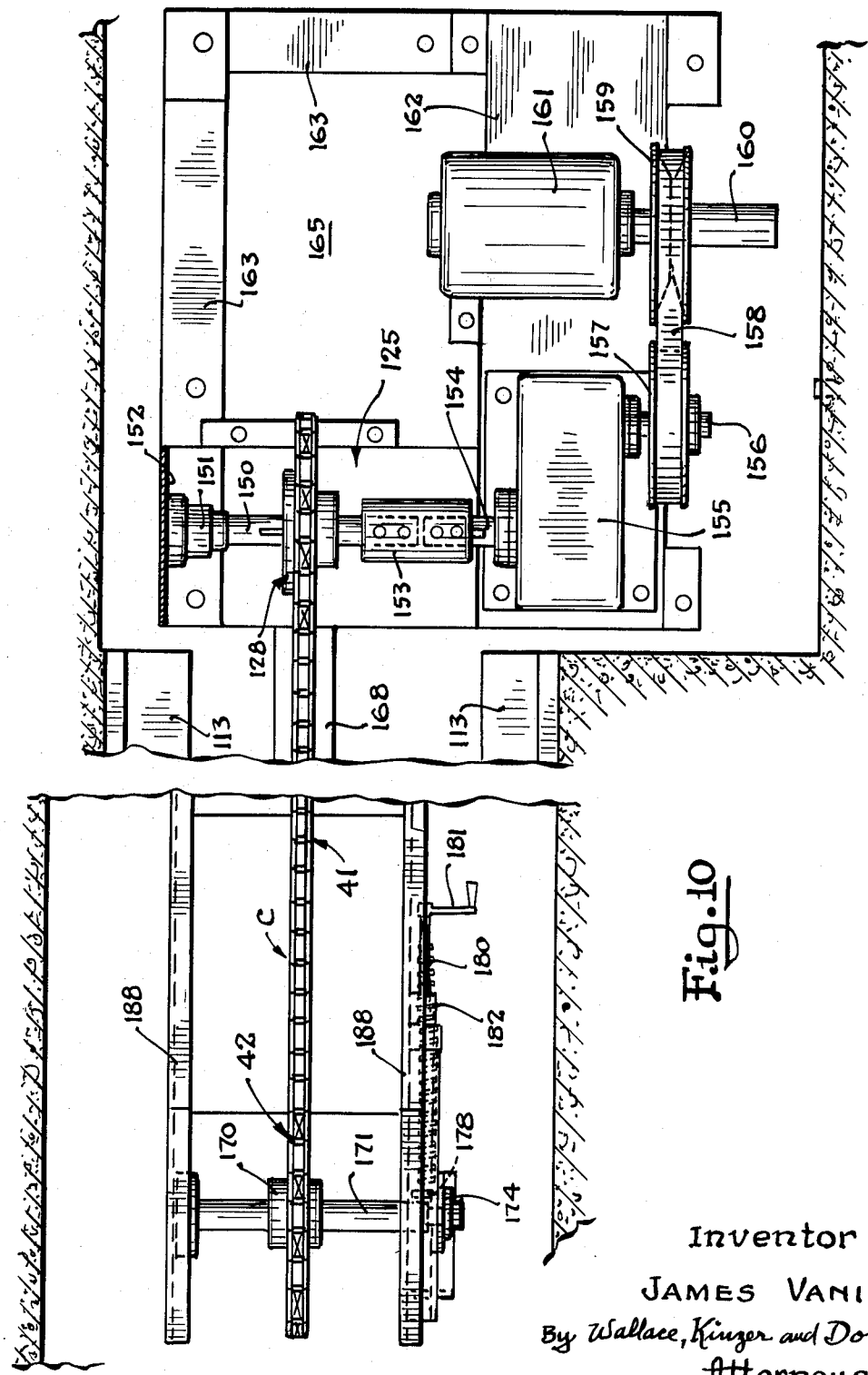
FIG. 10 is a plan view of the motor drive and take-up mechanisms for the conveyor chain.

The driving sprocket 128 for the chain C is mounted on a supporting shaft 150, which has one end journaled in a bearing 151, FIG. 10, on a vertical support plate 152, and which has its opposite end secured in a coupling 153. The coupling 153 joins for rotation the output shaft 154 of a gear reduction mechanism 155 and the sprocket shaft 150. The gear reduction mechanism 155 has an input shaft 156 with a pulley 157 driven by a belt 158 adapted to be entrained about a split pulley 159 mounted on a motor shaft 160 of a driving motor 161. The split pulley 159 has its pulley halves spring biased together in the conventional manner to afford a variable speed drive which changes with changes in load.

The support for the motor 161 includes a support plate 162 secured to channel members 163 supported on the floors 165 of the concrete foundation.

The carriage 32, upon being inverted, moves upwardly along an incline plate 168 to the generally horizontal Z-section members 115 which support the pair of spaced glide bars 120 for the glides G of the supporting links L to which the carriage 32 are attached. The glides 120 are inclined downwardly towards the sprocket 42 at the take-up end 126 so that the carriage 32 is inclined downwardly prior to being rotated from its inverted return position to its upright driving position.

The take-up sprocket 42 is secured by a coupling 170 to a support shaft 171 which is journaled for rotation in slides 174, FIG. 6. Each of the slides 174 are disposed to slide between a pair of spaced guide rails 175 and 176 so as to take up slack in the chain C when moved downwardly and to the left as viewed in FIG. 6. At least one of the slides 174 has secured thereto an enlarged head 178 of a worm gear shaft 180, which is adapted to be turned by crank handle 181 in a threaded sleeve 182. The threaded sleeve 182 is secured by fasteners 183 to the frame 184 for the guide rails 175 and 176. Thus, in a well-known manner, the turning of the crank handle 181 and the turning of the worm gear shaft 180 in the threaded sleeve 182 causes the slides 174 to move in a direction parallel to the slides 175 and 176. Movement of the slides 174 either takes up slack or affords more slack in the chain C, depending on the direction of rotation of the worm gear 180.

The upper portion or flight 41 of the chains C is guided by an idler sprocket 194 secured between a pair of opposed plates 195. The carriage 32 moves about the sprocket 42 between a pair of support members 188 which are fastened by fasteners 188F to the bottom of the pit at the take-up end of the conveyor 20 and the supports 188 are generally tapered by edges 189 towards the surface 45 and the trap door 43. Thus, the rollers 30 will engage the under surface of the trap door 43 and force the trap door 43 open as the rollers 76 engage the wear bars 77 and the rear wheels 52 roll across the top surfaces 45 of the horizontal support plates to complete a cycle of the conveyor.

From the foregoing, it will be apparent that the present invention is directed to a novel conveyor mechanism which is adapted to convey automobiles through a car wash line without requiring hooking or unhooking with chains or the like, as with prior art conveyor mechanisms and which upon meeting a car whose wheels resist forward movement because of being in gear or being braked move under the wheels and lift the wheel and pass thereunder without stressing the auto or the conveyor mechanism with a severe jolt, as with the prior art conveyor mechanisms.

Moreover, the present invention affords a unique conveyor mechanism adapted to maximize the flow of traffic through the car wash line by providing an inclined ramp to facilitate the driving of the front wheel over one or more of a series of carriages until the spacing between the preceding car and the car being parked is reduced to the desired minimum spacing. The present invention also affords a convenient manner of affixing a roller and its carriage to the chain in a detachable manner so that the spacing between rollers can be varied, according to the condition desired, and to facilitate the repair or replacement of any given roller or carriage parts.

Hence, while preferred embodiments of the invention have been described and illustrated, it is to be understood that they are capable of variation and modification.

I claim:

1. In a conveyor having a driven flight for transporting an automotive vehicle in a forward direction through apparatus where work is to be performed thereon, a roller engageable with the rear side of one of the vehicle wheels to urge the vehicle forwardly when the conveyor is actuated, a carriage connected to said driven flight and in which the roller is journaled for rotation with its upper periphery exposed whereby a vehicle wheel can be easily driven thereover to associate the vehicle with the conveyor and whereby the roller will roll idly under the vehicle wheel in the event the vehicle is not in neutral gear with the brakes released, a ramp bar supported by said carriage at the rear side of said roller and inclined upwardly in a forward direction to guide the vehicle wheel over the conveyor roller, and a safety bar supported by said carriage at the front of said roller to prevent the foot of a workman from being trapped under said roller.

2. In a conveyor having forward and return flights for transporting a vehicle in a forward direction through apparatus where work is to be performed thereon, transport structure including a conveyor roller engageable with the rear side of one of the vehicle wheels to urge the vehicle forwardly when the conveyor is actuated, a carriage in which the roller is journaled for rotation with its upper periphery exposed whereby a vehicle wheel can be easily driven thereover to associate the vehicle with the conveyor and whereby the roller will roll idly under the vehicle wheel in the event the vehicle is not in neutral gear with the brakes released, extendible jaw elements on said carriage below said roller enabling said carriage to be coupled and uncoupled on a selected link of a conveyor chain affording the flights of the conveyor, and means for driving the chain.

3. Transport structure according to claim 2 wherein said carriage includes guide and support rollers engageable with tracks in the course of the forward and return flights of the conveyor.

4. Transport structure according to claim 3 wherein the carriage includes a forwardly and upwardly inclined ramp bar at the rear side of said conveyor roller.

5. In a conveyor for transporting an automotive vehicle in a forward direction through apparatus where work is to be performed thereon, transport structure including a conveyor roller engageable with the rear side of one of the vehicle wheels to urge the vehicle forwardly when the conveyor is actuated, a carriage in which the roller is journaled for rotation with its upper periphery exposed whereby a vehicle wheel can be easily driven thereover to associate the vehicle with the conveyor and whereby the roller will roll idly under the vehicle wheel in the event the vehicle is not in neutral gear with the brakes released, a ramp bar at the rear side of said conveyor roller and inclined upwardly in the direction of the conveyor roller to ease the vehicle wheel over the conveyor roller, said carriage including a depending portion presenting extendible jaw means enabling the carriage to be clamped to a selected link of a conveyor chain having forward and return flights, means for driving the chain, and guide and support rollers journaled on the carriage for guiding and supporting the carriage in the course of the forward and return flights of said chain.

6. Transport structure according to claim 5 wherein said guide and support rollers are inclusive of a pair of rollers on opposite sides of said ramp bar and in which the upper peripheries thereof are substantially in the plane of said ramp bar.

7. Transport structure according to claim 5 in which the guide and support rollers are inclusive of a pair of rollers coaxial with and at opposite ends of the conveyor roller.

8. In a conveyor for transporting an automotive vehicle in a forward direction through apparatus where work is to be performed thereon, a roller engageable with the rear side of one of the vehicle wheels to urge the vehicle forwardly when the conveyor is actuated, a carriage in which the roller is journaled for rotation with its upper periphery exposed whereby a vehicle wheel can be easily driven thereover to associate the vehicle with the conveyor and whereby the roller will roll idly under the vehicle wheel in the event the vehicle is not in neutral gear with the brakes released, a ramp bar at the rear side of said conveyor roller and inclined upwardly in the direction of the conveyor roller to ease the vehicle wheel over the conveyor roller, said carriage including a depending portion presenting extendible jaw means enabling the carriage to be clamped to a selected link of a conveyor chain having forward and return flights, means for driving the chain, a pair of guide and support rollers supported on the carriage at the ends of and coaxial with the conveyor roller, a pair of guide and support rollers supported on the carriage at opposite sides of said ramp bar and presenting upper peripheries substantially in the plane of said ramp bar, and a safety bar on the carriage at the front of the conveyor roller and effective to prevent the foot of an attendant from being trapped under the conveyor roller.

9. In a conveyor for transporting an automotive vehicle in a forward direction through apparatus where work is to be performed thereon, an endless chain having vertically spaced forward and return flights, vehicle transport structure including a conveyor roller engageable with the rear side of one of the vehicle wheels to urge the vehicle forwardly when the chain is driven, a carriage in which the conveyor roller is journaled for rotation whereby a vehicle wheel can be easily driven thereover to associate the vehicle with the conveyor and whereby the conveyor roller will roll idly under the vehicle wheel in the event the vehicle is not in neutral gear with the brakes released, a ramp bar supported by said carriage at the rear of said conveyor roller and inclined upwardly in a forward direction to lead the vehicle wheel over the conveyor roller, a safety bar at the front of the conveyor roller to prevent the foot of an attendant from being trapped by the conveyor roller, said carriage including a depending part below the conveyor roller presenting a pair of extendible jaws coupling the carriage to a selected one of the links of said chain, means to drive the chain, means on the carriage for adjusting said jaws to vary the tension thereof on said chain link, a first pair of guide and support rollers at the ends of said conveyor roller engaging a support track that parallels the forward flight of the conveyor chain, a second set of guide and support rollers on opposite sides of said ramp bar serving to ease movement of the vehicle wheel up the ramp bar and being engageable with a second track that parallels the forward flight and the return flight of said chain, a first trap door at the end of the forward flight of said chain and arranged to be nudged open by a part of said transport structure in the course of changing from a forward to a return flight, and a second trap door at the end of the return flight of said chain and arranged to be nudged open by a part of said transport structure in the course of changing from a return to a forward flight.

10. In a conveyor having a driven flight for transporting an automotive vehicle in a forward direction through apparatus where work is to be performed thereon, a carriage including means thereon enabling the carriage to be connected to said flight for movement therewith in a forward direction, roller means engageable with the rear side of one of the vehicle wheels to move the vehicle forwardly upon forward movement of said roller means, said roller means being rotatably supported on said carriage with the upper periphery thereof exposed whereby a vehicle wheel can be easily driven thereover to associate the vehicle with the carriage and whereby the roller will roll idly under the vehicle wheel in the event the vehicle is not in neutral gear with the brakes released upon forward movement of said carriage with said conveyor flight, axle means for the roller means, and bearing means rigidly supporting said axle means against bending forces imposed thereon due to the weight of a vehicle imposed on said roller means.

11. Structure according to claim 10 wherein the bearing means includes a pair of roller supports at opposite ends of said axle means together with wear plates along the path of the conveyor flight engageable by said roller supports.

12. Structure according to claim 11 wherein there are additional rollers on the carriage engageable with rigid supports which extend along the path of the conveyor flight.

References Cited by the Examiner

UNITED STATES PATENTS

| 2,016,662 | 10/1935 | Aitken | 105—27 |
| 3,006,285 | 10/1961 | Diehl | 105—27 X |
| 3,196,806 | 7/1965 | Brunder | 104—172 |

FOREIGN PATENTS 518,799   3/1931   Germany.

ARTHUR L. LA POINT, *Primary Examiner.*

F. W. MONAGHAN, *Assistant Examiner.*